(No Model.)
W. P. & J. W. KIRCHHOFF.
PROCESS OF AND APPARATUS FOR THE MANUFACTURE OF CONFECTIONERY.
No. 309,720. Patented Dec. 23, 1884.
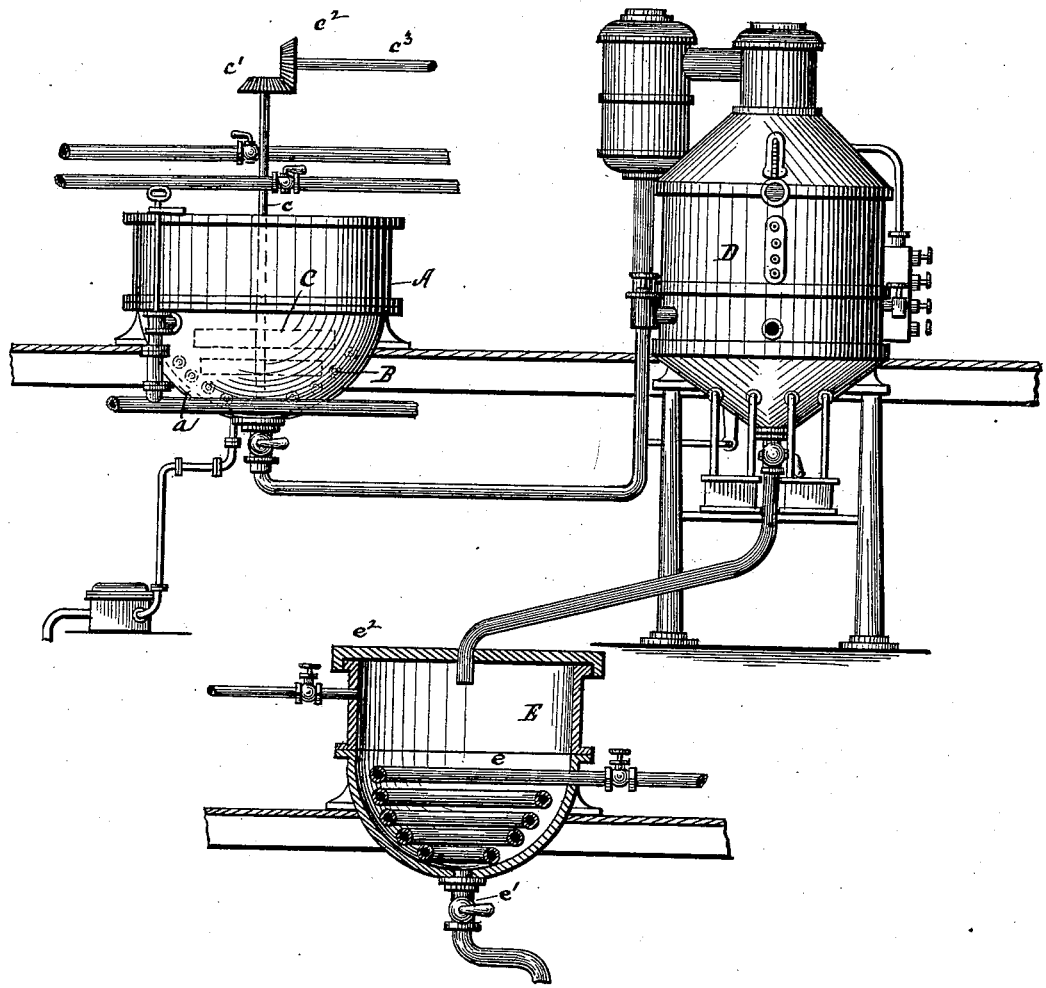
WITNESSES
INVENTORS

UNITED STATES PATENT OFFICE.

WILLIAM P. KIRCHHOFF AND JAMES W. KIRCHHOFF, OF NEW ORLEANS, LA.

PROCESS OF AND APPARATUS FOR THE MANUFACTURE OF CONFECTIONERY.

SPECIFICATION forming part of Letters Patent No. 309,720, dated December 23, 1884.

Application filed March 28, 1884. (No model.)

*To all whom it may concern:*

Be it known that we, WILLIAM P. KIRCHHOFF and JAMES W. KIRCHHOFF, of New Orleans, in the parish of Orleans and State of Louisiana, have invented certain new and useful Improvements in Processes of and Apparatus for the Manufacture of Confectionery; and we do hereby declare the following to be a full, clear, and exact description of the invention, such as will enable others skilled in the art to which it pertains to make and use the same.

Our invention relates to processes for manufacturing candies, jellies, preserves, and confectioneries generally; and it consists of a process embracing the following steps, to wit: first, dissolving the cane-sugars and grape-sugar separately or together in a vessel having a steam-jacket, a steam-coil, and a stirrer for mixing the contents; second, boiling the dissolved cane sugars or sirup and grape-sugar or glucose into candy by means of a vacuum-pan or any other vessel from which the air and vapors are extracted, either by air-pump, by condensation, by water-spray, surface-condenser, or any other combination of either two or all three methods combined; third, cooling or heating the boiled product in a vessel constructed with a double bottom and jacket, by which either water or steam can be circulated, so as to cool or heat the contents to a desired temperature or keep it at any desired temperature by regulating the steam or water supply.

By using the above-described process we will be enabled to use sugars and molasses or sirups of lower grades than are used by the present process of manufacturing candies and other confectioneries. Candies and other confectioneries can be manufactured at a saving of time and labor, thus reducing the first cost of same. The sugars and sirups used in the manufacture of candies are not discolored by long boiling and exposed to high temperatures. The sirups and sugars used in the manufacture of candies and other confectioneries are not converted into grape-sugar, thus enabling the manufacturer to use a much larger percentage of grape-sugar or glucose in making candies and other confectioneries. A great saving of fuel is accomplished throughout the entire process, thus again reducing the first cost of products. The cooling apparatus enables the operator to turn out a larger quantity of candies or other confectioneries, in either hot or cold weather, than can be accomplished with the old process.

Our invention further consists in the apparatus for carrying out the above-described process, said apparatus being illustrated in the accompanying drawing, in which A represents a melting-pan constructed with a double bottom, $a$, for steam, and provided with a steam-coil, B. The vessel is provided with all of the necessary fittings and appliances for water, steam, and for discharging the contents of the vessel.

C represents a stirrer, whose shaft $c$ is provided with a bevel gear-wheel, $c'$, meshing with a similar wheel, $c^2$, upon a power-shaft, $c^3$.

D represents a vacuum-pan used for boiling, and constructed with a double bottom, and fitted with all of the necessary connections and fittings, such as steam-coils, charging and discharging valves, vacuum-gages, steam and heat gages, sirup-tester, and proof-stick.

E represents a heating and cooling tank formed with double bottom and sides, steam-coil $e$, discharge-valve $e'$, and wooden cover $e^2$.

Having fully described our invention, what we claim as new, and desire to secure by Letters Patent, is—

1. The herein-described process for manufacturing candies, &c., consisting in, first, dissolving the cane-sugars and grape-sugar separately or together in a vessel having a steam-jacket, a steam-coil, and a stirrer; second, boiling the dissolved sugars or sirups into candy by means of a vacuum-pan or other vessel from which air and vapors have been extracted; and, finally, cooling or heating the boiled products in a vessel subjected to the action of water, as set forth.

2. An apparatus for candy, &c., consisting of the combination, with a melting-pan provided with a steam-coil and a stirrer, of a vacuum boiling-pan and a cooling-tank provided with a coil, said pans and tank being connected together by pipes having faucets for controlling the flow of the melted material, substantially as set forth.

In testimony whereof we have signed this specification in the presence of two subscribing witnesses.

WILLIAM P. KIRCHHOFF.
JAS. W. KIRCHHOFF.

Witnesses:
J. BENDERNAND,
F. J. SCHONEKAS.